United States Patent
Peck

(10) Patent No.: US 10,482,479 B2
(45) Date of Patent: Nov. 19, 2019

(54) FAST CALCULATIONS OF TOTAL UNDUPLICATED REACH AND FREQUENCY STATISTICS

(71) Applicant: International Business Machines Corporation, Armonk, NY (US)

(72) Inventor: Jon K. Peck, Sante Fe, NM (US)

(73) Assignee: International Business Machines Corporation, Armonk, NY (US)

(*) Notice: Subject to any disclaimer, the term of this patent is extended or adjusted under 35 U.S.C. 154(b) by 569 days.

(21) Appl. No.: 14/803,165

(22) Filed: Jul. 20, 2015

(65) Prior Publication Data

US 2017/0024747 A1    Jan. 26, 2017

(51) Int. Cl.
*G06Q 30/02* (2012.01)

(52) U.S. Cl.
CPC ..... *G06Q 30/0201* (2013.01); *G06Q 30/0204* (2013.01)

(58) Field of Classification Search
CPC ................................................... G06Q 30/02
See application file for complete search history.

(56) References Cited

U.S. PATENT DOCUMENTS

| | | | |
|---|---|---|---|
| 7,937,287 B2 | 5/2011 | Gaia et al. | |
| 7,996,256 B1* | 8/2011 | Anand | G06Q 30/02 705/7.29 |
| 2005/0171897 A1* | 8/2005 | Forsythe | G06Q 20/102 705/37 |
| 2008/0133325 A1 | 6/2008 | De et al. | |
| 2009/0083118 A1 | 3/2009 | Kallery et al. | |
| 2010/0191570 A1* | 7/2010 | Michaud | G06Q 30/02 705/7.33 |
| 2012/0271884 A1 | 10/2012 | Holmes et al. | |
| 2014/0114722 A1* | 4/2014 | Mohan | G06Q 30/0201 705/7.29 |

(Continued)

OTHER PUBLICATIONS

Ennis et al., "eTURF: A competitive TURF algorithm for large datasets", Food Quality and Preference, vol. 23, (2012), pp. 42-48.

(Continued)

*Primary Examiner* — Kurtis Gills
(74) *Attorney, Agent, or Firm* — Rakesh Roy

(57) ABSTRACT

Embodiments of the present invention disclose a method, computer program product, and system for performing a total unduplicated reach and frequency analysis that analyzes a large set of variables practically. A plurality of variables are received. A subset of the plurality of variables is identified as variables of interest. Variables are partitioned randomly into groups. Each of the groups of variables contains fewer than a predetermined maximum number of variables for each group. The best combination of variables within each group is found through a total unduplicated reach and frequency analysis of each group. The winning variable or variables within each group are identified based on the highest reach score. The winners from each group analysis are then pooled into a group, and the process is repeated. The combination from the second stage with the best reach is then reported. Additional variable combinations ranked by reach may also be reported.

5 Claims, 4 Drawing Sheets

(56) References Cited

U.S. PATENT DOCUMENTS

2014/0278914 A1* 9/2014 Gurumoorthy .... G06Q 30/0243
  705/14.42
2014/0316995 A1  10/2014 Paul et al.

OTHER PUBLICATIONS

Serra, "Implementing TURF analysis through binary linear programming1", Department of Economics and Business, Universitat Pompeu Fabra, Spain, Available online Oct. 25, 2012, pp. 1-23.
BusinessWire, "QuestionPro Expands Product Offering to Include Tools TURF Analysis", Jul. 23, 2003, p. 1.
IBM: List of IBM Patents or Patent Applications Treated as Related (Appendix P), May 6, 2016, pp. 1-2.
Peck, Pending U.S. Appl. No. 15/147,999, filed May 6, 2016, titled "Fast Calculations of Total Unduplicated Reach and Frequency Statistics," pp. 1-27.

* cited by examiner

FAST CALCULATIONS OF TOTAL UNDUPLICATED REACH AND FREQUENCY STATISTICS

BACKGROUND

The present invention relates generally to the field of product marketing research, and more particularly to total unduplicated reach and frequency analysis.

Rating scales are common tools in marketing for measuring customer preferences for products, or features of products, that may influence a company or business owner's use or promotion of a product or feature. For example, a common analysis tool to determine the optimal product or feature for sale is total unduplicated reach and frequency analysis, or "TURF." TURF is a type of analysis that determines possible combinations of products or records that are attractive to the largest number of potential customers. TURF is also commonly used in conjunction with rating scales for product line optimization. The most common metrics are the percentage of potential customers that desire at least one product in a bundle of a limited number of products, the "reach," or the total number of occurrences that any product in the bundle is selected, or "frequency." The TURF analysis also deals with combinations of reach and frequency in order to demonstrate and approximate a customer desire for a certain product or feature of a product. A user of TURF analysis may also alter the definitions of reach or frequency by specifying the desirability threshold. As the number of products or features, collectively "variables," increases, the computational resources required to perform the TURF analysis increase as each new variable requires an analysis of all combinations with previous variables and the new variable. While TURF analysis of 10-20 variables may be reasonable, analysis of 50 or more variables becomes resource and cost prohibitive.

SUMMARY

Embodiments of the present invention disclose a method, computer program product, and system for performing a total unduplicated reach and frequency analysis that makes analysis of a large set of variables computationally practical. A plurality of variables are received. A subset of the plurality of variables is identified as variables of interest. Variables are partitioned randomly into groups. Each of the groups of variables contains fewer than a predetermined maximum number of variables for each group. The best combination of variables within each group is found through a total unduplicated reach and frequency analysis of each group. The winning variable or variables within each group are identified based on the highest reach score. The winners from each group analysis are then pooled into a group, and the process is repeated. The combination from the second stage with the best reach is then reported. Additional variable combinations ranked by reach may also be reported.

DETAILED DESCRIPTION

Figure 1:
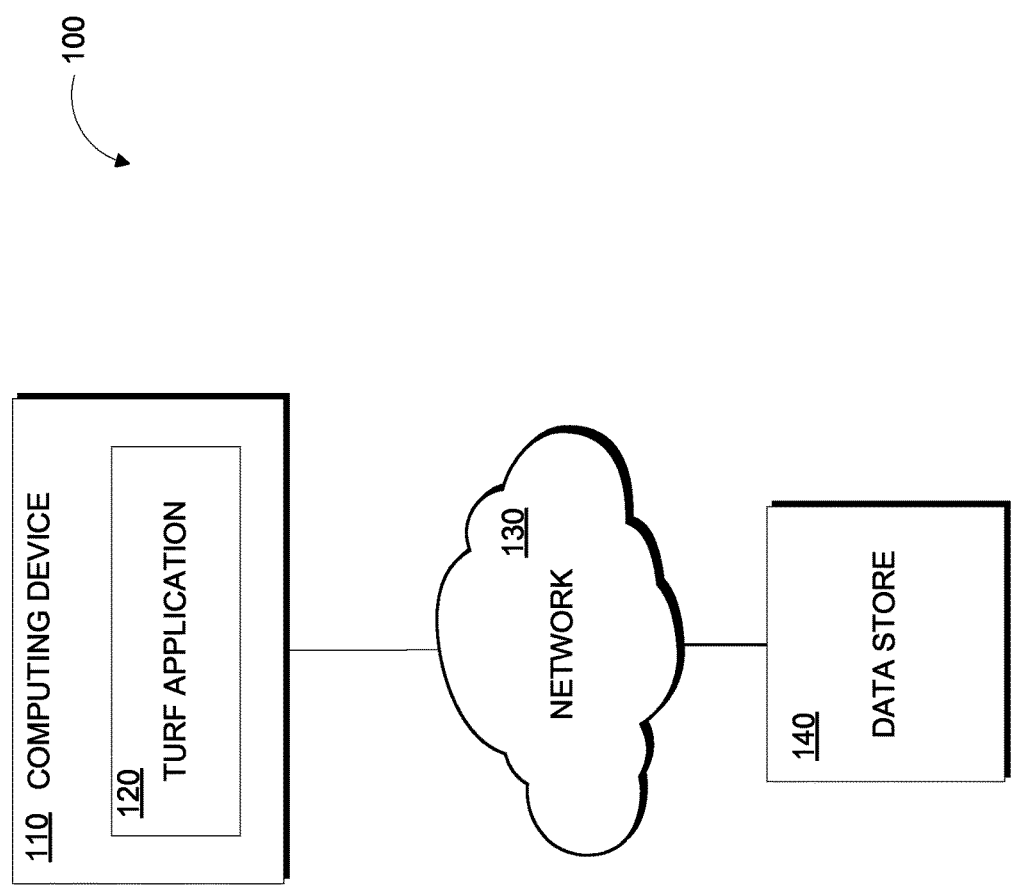
FIG. 1 is a functional block diagram illustrating a distributed data processing environment, in accordance with an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A business owner engaged in the ecommerce space may find it important to be able to provide relevant products that a customer desires, as well as, attracting that customer to a particular store front or site. Various embodiments of the invention may aid in determining what variables resonate with customers, as that may be difficult to determine without direct feedback. Store owners may utilize surveys to determine what variables, or factors, determine whether a customer will shop at a particular store and what products they may purchase.

Conventional approaches to determine these variables may involve surveying customers on each variable and having the customer rate each variable on a scale of desirability. Analysis of survey results may be needed to determine which variables are most attractive which is commonly achieved using a Total Unduplicated Reach and Frequency analysis, or TURF analysis. A TURF analysis of preference survey results determine the combination of variables that maximizes the "reach," or the probability that a random customer will find at least one variable in the chosen variable set to which they would give a high rating. For example, an ice cream shop owner may only have the capacity for 3 ice cream flavors in a store, therefore, the combination of three flavors offered must have the maximum reach to maximize the potential customer base for the limited flavors available. When analyzing survey results without TURF the solution for maximum reach may seem to be the 3 most popular flavors amongst the survey results, for example, vanilla, chocolate, and strawberry. However this may not be the optimal solution as if all customers who like chocolate also like vanilla, having both of those overlapping flavors does not increase customer reach, where a slightly less rated flavor, for example, mint, may be determined to have a better reach via a TURF analysis. TURF is applicable to many industries, for example, products being advertised or the most popular location for a conference.

Embodiments of the present invention will be described with reference to the Figures. FIG. 1 is a functional block diagram illustrating a distributed data processing environment, generally designated 100, in accordance with one embodiment of the present invention.

Distributed data processing environment 100 includes computing device 110, and data store 140, interconnected over network 130.

Network 130 may include permanent connections, such as wire or fiber optic cables, or temporary connections made through telephone or wireless communications. Network 130 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Network 130 may also include a number of different types of networks, such as, for example, an intranet, a local area network (LAN), or a wide area network (WAN).

Each of computing device 110 and data store 140 may be a laptop computer, tablet computer, netbook computer, personal computer (PC), desktop computer, smart phone, or any programmable electronic device capable of an exchange of data packets with other electronic devices, for example, through a network adapter, in accordance with an embodiment of the invention, and which may be described generally with respect to FIG. 4 below. Although data store 140 is described herein as programmable electronic device, this is merely one embodiment. Data store 140 may be a separate server or series of servers, a database, or other data storage, internal or external to computing device 110.

Computing device 110 includes turf application 120, as described in greater detail below, with reference to FIG. 2. In various embodiments of the invention, computing device 110 operates generally to receive data from a data store, for example, data store 140, and to host applications, for example, turf application 120, which may process and store data.

Turf application 120 may be for example, database oriented, computation oriented, or a combination of these. Turf application 120 may operate generally to receive and process one or more different survey results from a client or data store, for example, data store 140, via computing device 110. Survey results may contain numerical or textual data. Turf application 120 may process data by performing a TURF analysis on received data in a tournament style manner.

In various embodiments of the invention, data store 140 may operate generally to receive and store customer survey results and to communicate customer survey results to another computing device, for example, computing device 110 via network 130.

In various embodiments of the invention, TURF application 120 may receive, from data store 140, textual or numerical data based on customer survey results, or "variables," that may represent the results of a customer survey. Turf application 120 may identify variables that should be analyzed. Turf application 120 may identify at least one variable that meets a desirability criteria, for example, identifying variables that have a rating score on a survey above a threshold value, or "rating threshold." Identified variables may be dichotomized into desirable or undesirable, for example, a variable above a rating threshold may be stored in a data store in variable as a value of "1," indicating desirability, or a variable below a rating threshold may be stored as a value of "0," indicating undesirability. In various embodiments, a rating threshold may be predetermined by a user. In various embodiments, identification of desired variables for analysis may be based on client input, analysis history, or a saved profile saved on a data store on computing device 110. Turf application 120 may partition identified variables into groups at random. Turf application 120 may perform a TURF analysis on each group, generating a corresponding reach scores for each group.

In various embodiments of the invention, turf application 120 may group identified variables into random subsets and determine for each subset the variables with the highest reach. The best combinations from each group in the first stage are then combined into a new group, and the process is repeated. If the total number of variables is sufficiently small, all variables may form a single group, and only one stage is required. The total number of variables may be determined to be sufficiently small if the number of variables in a single group is below a second threshold, or "analysis threshold." If the number of variables in a single group is below an analysis threshold, turf application 120 may perform a TURF analysis on the single group of variables. If the number of variables within the single group is above an analysis threshold, turf application 120 may repartition the variables of the single group into multiple groups and analyze as described above.

For example, an ice cream shop owner may provide customers with a survey where customers rate ice cream flavors on a 10 point scale, for example, from 1 to 10 and are instructed to rate various flavors of ice cream. Data store 140 may receive flavors of ice cream with the corresponding rating, based on the provided survey results, and may store the results in memory. Turf application 120 may receive customer survey results from data store 140 via computing device 110. Turf application 120 may receive 50 flavors of ice cream and turf application 120 may assign a 1 or 0 to each of the flavors if the flavor received a rating above a rating threshold, for example, 5 on the 10 point scale. Turf application 120 may randomly partitioned the flavors into groups of 10 and perform a TURF analysis on each group. Turf application 120 may regroup 25 flavors that have the greatest reach, as determined by the TURF analysis. The number of flavors that have been regrouped may be above an analysis threshold and turf application 120 may repartition the flavors into a "second heat" of groups of 5 at random. Turf application 120 may perform a TURF analysis on each of the second heat groups and regroup 10 ice cream flavors that have the greatest reach score in the second heat. Turf application 120 may determine the group of 10 flavors is below the analysis threshold and may perform a final TURF analysis on the regroup of variables from the second heat.

Figure 2:
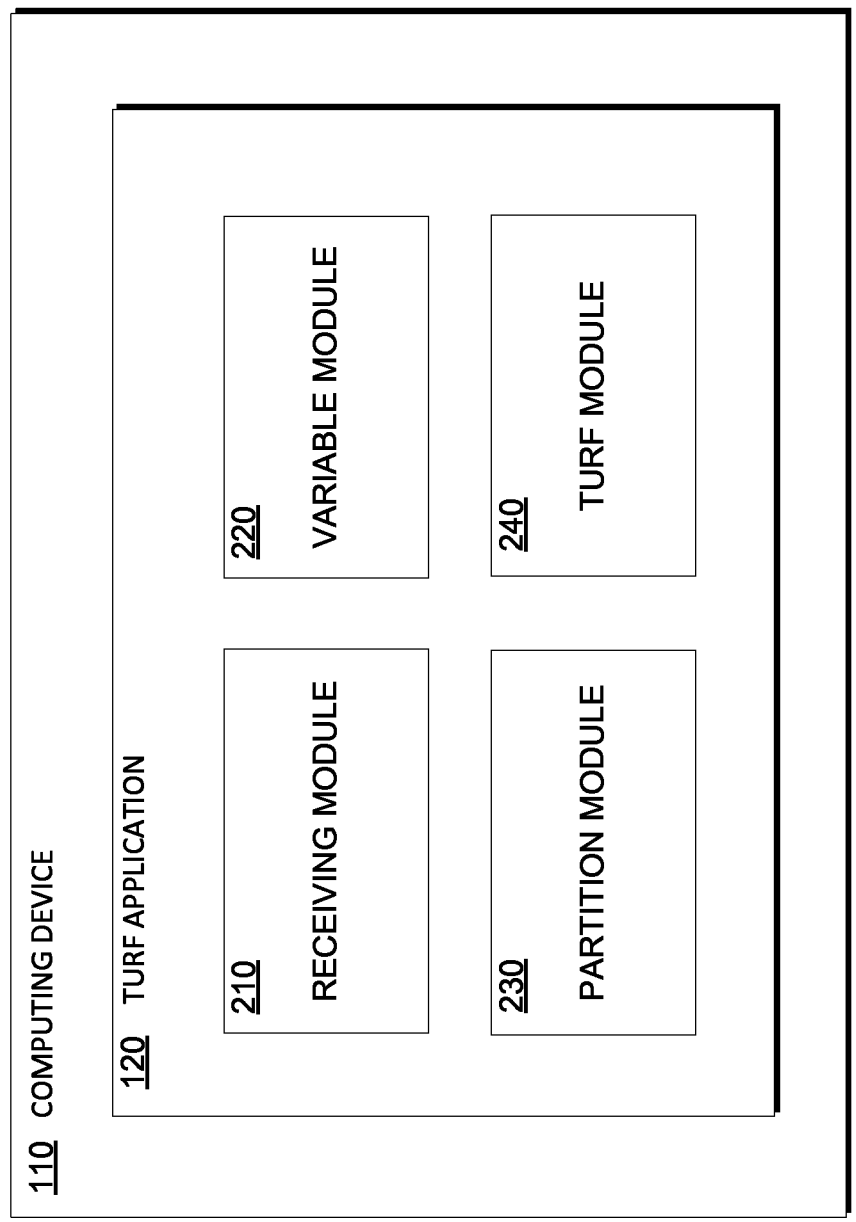
FIG. 2 is a functional block diagram illustrating the components of an application within the distributed data processing environment, in accordance with an embodiment of the present invention.

FIG. 2 is a functional block diagram illustrating the components of computing device 110, including the components of turf application 120, functioning within the distributed data processing environment, in accordance with an embodiment of the present invention. Turf application 120 may receive and perform TURF analysis on data sets as described above. Turf application 120 includes receiving module 210, variable module 220, partition module 230, and turf module 240.

In reference to FIGS. 1 and 2, in various embodiments of the invention, receiving module 210 may receive data based on one or more customer survey results, from one or more clients, for example data store 140, as described above. The received data may consist of textual data based on "variable labels" and/or numerical data based on ratings given to each variable. The variable labels and corresponding rating data may be stored, by receiving module 210, in a list in a data store as "variables." Receiving module 210 may communicate the list of variables to variable module 220.

In various embodiments of the invention, variable module 220 may receive a list of variables from receiving module 210 and store that list in memory. Variable module 220 may identify variables from the list of variables as "variables of interest." Variables of interest may be determined by a product reach criteria. A product reach criteria may be predetermined by a user and may be based on the availability or willingness of a client to produce a certain variable. For example, if receiving module 210 may receive a list of fragrances from data store 140 via computing device 110. Certain fragrances may not be desirable due to manufacture limitations, the time it would take to receive materials relative to a peak sales period, or an unwillingness the fragrance manufacture may attach to a certain fragrance(s). Variable module 220 may receive criteria eliminating certain fragrances from the list of fragrances received from receiving module 210. Variable module 220 may communicate only variables of interest to partition module 230.

Partition module 230 may act generally to receive variables and place received variables into groups. Partition module 230 may identify at least one received variable that meets rating threshold, as described above. Identified variables may be dichotomized into desirable or undesirable, for example, a variable above a rating threshold may be stored in a data store in variable as a value of "1," indicating desirability, or a variable below a rating threshold may be stored as a value of "0," indicating undesirability. Partition module 230 may group desirable variable, undesirable variables, or a combination and may store groups in a data store in memory as distinct lists with a group identifier, or group label, with the corresponding variables in that group. Partition module 230 may distribute variables into groups at random, in order they are received, or in various distributions. Partition module 230 may distribute variables into groups evenly, for example, partition module 230 receives 30 variables and distributed the variables randomly into three groups of ten. This is merely one example and does not represent all the ways partition module 230 may distribute variables into groups. Group distribution may be predetermined by a user. Partition module 230 may communicate groups of variables to turf module 240.

Turf module 240 may act generally to receive groups of variables and perform a TURF analysis, as described above. Turf module 240 may receive a group of variables from partition module 230. Turf module 240 may perform a TURF analysis on the group of variables, calculate a reach score for each of the variables within the group, and store the group of variables with the corresponding reach scores in a data store in memory. Turf module 240 may communicate the stored group of variables and corresponding reach scores to partition module 230. The above description may represent a "first heat" in the tournament style TURF analysis.

In various embodiments of the invention, partition module 230 may receive an analyzed group of variables from turf module 240. Partition module 230 may partition variables received from turf module 240 that have the highest reach, or "winning groups." Partition module 230 may determine the number of variables in the winning groups of analyzed variables is above an analysis threshold value. An analysis threshold value may be a value based on the number of variables that a TURF analysis can be performed upon without the analysis being time or resource prohibitive. Partition module 230 may redistribute the winning groups of analyzed variables into random groups and communicate the new groups to turf module 240 for analysis as described above. This may represent a "second heat" in the tournament style TURF analysis. In various embodiments, "heats" may continue until partition module 230 groups received variables and the number of variables in that group are below the analysis threshold. Partition module 230 may communicate the single group to turf module 240 and turf module 240 may perform a TURF analysis on the single group and communicate the results or store the results in a data store in memory. This may represent the "final heat" in the tournament style TURF analysis.

For example, 10 groups of 10 variables each are received by turf module 240. Turf module 240 performs a TURF analysis on each group and communicates the winning groups of variables to partition module 230. Partition module 230 partitions variables with highest reach score, for example, 5. Partition module 230 may check a predetermined analysis threshold, for example 20. The 5 variables from each of the 10 groups of variables are, in total, more than the analysis threshold, therefore, partition module 230 may distribute the 50 variables into 5 groups of 10 and communicate the groups to turf module 240 for analysis. Turf module 240 may perform a TURF analysis on the variables in each group and communicate the results to partition module 230. Distribution into groups by partition module 230 and TURF analysis by turf module 240 may continue until a winning group of analyzed variables below the analysis threshold. This may represent the final heat where partition module 230 groups all variables into a single group, communicates that group to turf module 240, turf module 240 performs a TURF analysis on the group of variables and may communicate the results to a user or store in a data store in memory.

In various embodiments of the invention partition module 230 may base the analysis threshold value on periodically determining the available resources of computing device 110, or computational resource value, a received maximum amount of time, or temporal limitation value, or on the predetermined value where the number of variables in the final heat group cannot exceed 125% times the number of variables in the initial heat groups.

Figure 3:
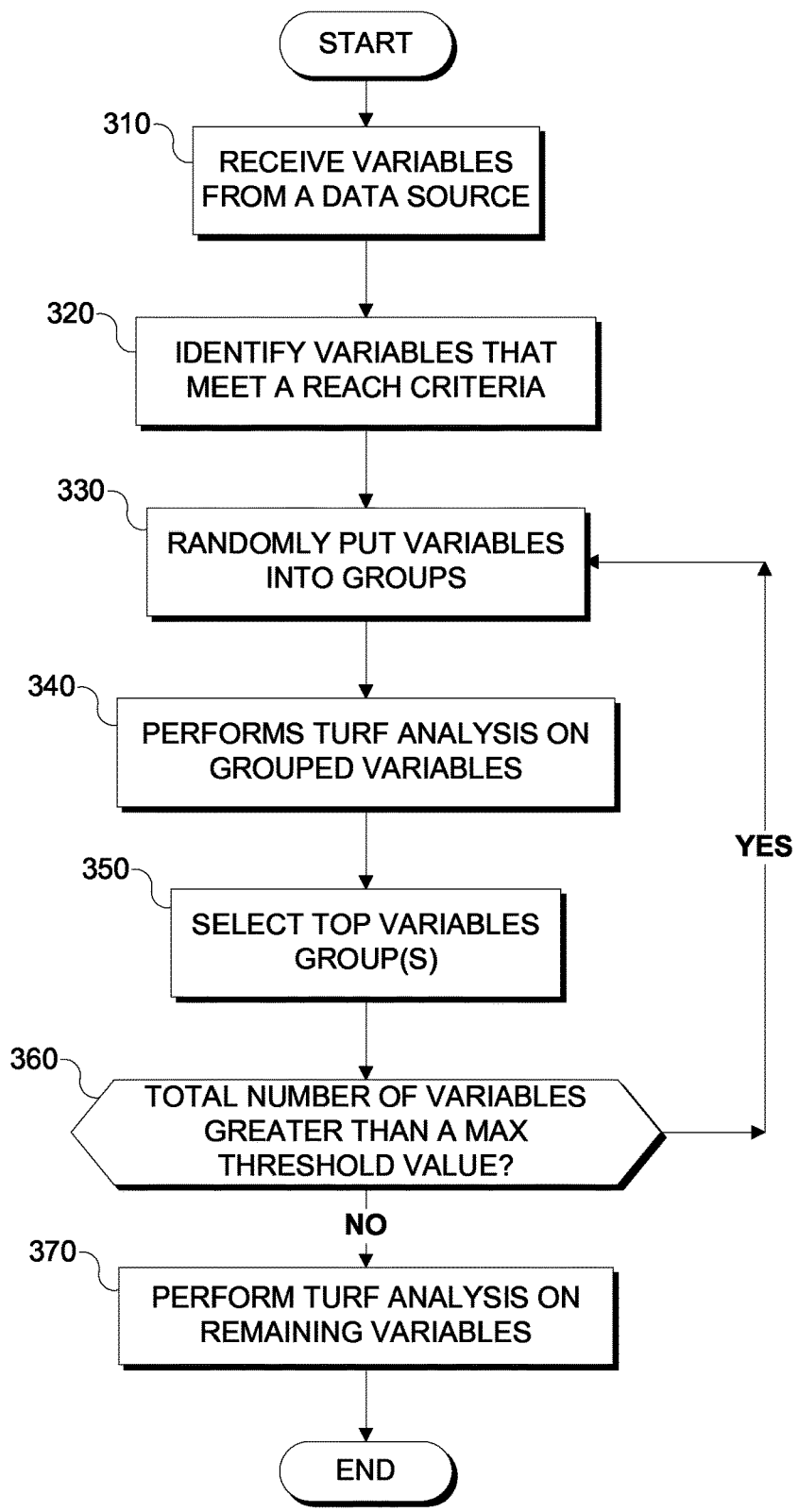
FIG. 3 is a flowchart depicting operational steps of an application on a computing device, within the data processing environment of FIG. 1, for performing a total unduplicated reach and frequency analysis, in accordance with an embodiment of the present invention.

FIG. 3 is a flowchart depicting operational steps of an application on a computing device, within the data processing environment of FIG. 1, for performing a total unduplicated reach and frequency analysis, in accordance with an embodiment of the present invention. Referring now to FIGS. 1, 2, and 3, receiving module 210 receives variables from data store 140 (step 310). The variables may contain numerical or textual data as described above.

Variable module 220 identifies variables for analysis (step 320) as described above and communicated identified variables to partition module 230. Partition module 230 randomly puts variables in to groups of a predetermined size (step 330). Partition module 230 communicate the group(s) of variables to turf module 240.

Turf module 240 performs a TURF analysis on each received group of variables (step 340). The results may include a reach score that is associated with the corresponding analyzed variable. Turf module 240 communicates the TURF analysis results to partition module 230.

Partition module 230 may receive a predetermined analysis threshold (not shown). Partition module 230 orders the analyzed variables of each group by the corresponding reach score of each group and partitions the variables from the group with the greatest reach score (step 350) into a new group. Partition module 230 determines if the number of variables, in the group of variables with the greatest reach score, exceeds an analysis threshold value (decision step 360).

If the number of analyzed variables exceeds the analysis threshold value (decision step 360 "YES" branch) the analyzed variables are partitioned into random groups. If the number of analyzed variables does not exceed the analysis threshold (decision step 360 "NO" branch) the variables are partitioned into a single group and communicated to turf module 240. Turf module 240 performs a TURF analysis on the single group of variables and stores or communicated the results (step 370).

Figure 4:
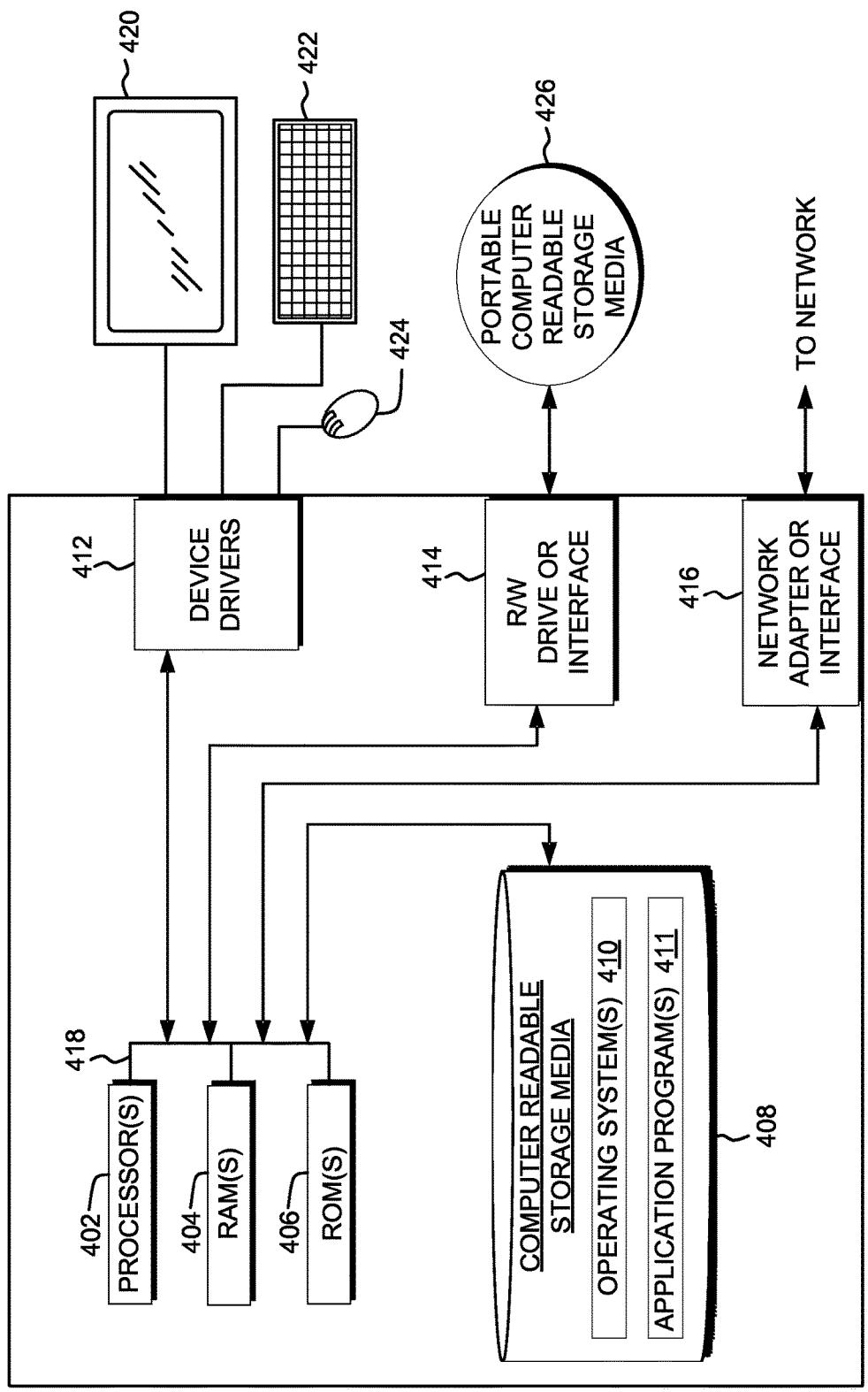
FIG. 4 depicts a block diagram of components of the computing device, in accordance with an embodiment of the present invention.

FIG. 4 depicts a block diagram of components of computing device 110 and data store 140 of distributed data processing environment 100, of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 and data store 140 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, turf application 120, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 and data store 140 may also include a R/W drive or interface 414 to read from and write to one or more portable computer readable storage media 426. Application programs 411 on computing device 110 and data store 140 may be stored on one or more of the portable computer readable storage media 426, read via the respective R/W drive or interface 414 and loaded into the respective computer readable storage media 408.

Computing device 110 and data store 140 may also include a network adapter or interface 416, such as a TCP/IP adapter card or wireless communication adapter (such as a 4G wireless communication adapter using OFDMA technology). Application programs 411 on computing device 110 and data store 140 may be downloaded to a computing device, for example, computing device 110, from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Computing device 110 and data store 140 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer implemented method for performing a total unduplicated reach and frequency analysis performed via a turf analysis application executing in a distributed data processing environment, the method comprising:
   receiving a plurality of variables containing numerical or textual values from a data store;
   in response applying a weight to the plurality of variables based on a first user selection input, via a user device, identifying a subset of variables of the plurality of variables, wherein the subset of variables is identified based on the associated weight meeting a product reach criteria value;
   partitioning the subset of variables into a plurality of groups of variables, wherein the groups of variables are partitioned based on an associated weight rank value, wherein each of the plurality of groups of variables contains less than a predetermined maximum number of variables;
   calculating a reach score for each group of variables of the plurality of groups of variables;
   wherein the reach score is based on a first total unduplicated reach and frequency analysis;
   identifying at least one group of variables, of the plurality of groups of variables that has a reach score above a first threshold value;
   communicating, for display via the user device, the identified at least one group of variables and associated reach score and a set of first total unduplicated reach and frequency analysis results to the user;
   receiving a second user selection input from the user, wherein the second user selection input modifies one or more variables of the at least one group of variables;
   determining, using a processor that periodically determines at least one available resource of the computer for performing the total unduplicated reach and frequency analysis, an available computational resource value; and
   in response to a determination that a count of identified variables of the modified at least one group of variables is below a second threshold value, wherein the second threshold value is based on the determined available computational resource value, performing a second total unduplicated reach and frequency analysis, of the identified at least one group of variables.

2. The method of claim 1, wherein product reach criteria is based on a predetermined criteria that includes one or more of:
   performing the total unduplicated reach and frequency is not time prohibitive; and
   performing the total unduplicated reach and frequency is not resource prohibited.

3. The method of claim 1, wherein the subset of partitioned variables are grouped as one or more of grouped randomly and grouped in a predetermined order.

4. The method of claim 1, wherein a first threshold value includes a probability based on whether one or more of the identified grouped variables will be selected by a target customer.

5. The method of claim 4, wherein the target customer is based on a demographic.

* * * * *